US012137665B2

(12) United States Patent
Lindgren

(10) Patent No.: US 12,137,665 B2
(45) Date of Patent: Nov. 12, 2024

(54) METHOD AND DEVICE FOR LAMINATING LAYERS OF CHEESE

(71) Applicant: Daniel R. Lindgren, Reedsville, WI (US)

(72) Inventor: Daniel R. Lindgren, Reedsville, WI (US)

( * ) Notice: Subject to any disclaimer, the term of this patent is extended or adjusted under 35 U.S.C. 154(b) by 0 days.

(21) Appl. No.: 16/683,678

(22) Filed: Nov. 14, 2019

(65) Prior Publication Data

US 2020/0077615 A1 Mar. 12, 2020

Related U.S. Application Data

(63) Continuation-in-part of application No. 14/162,911, filed on Jan. 24, 2014, now Pat. No. 10,588,290.

(51) Int. Cl.
| | |
|---|---|
| *A01J 25/00* | (2006.01) |
| *A01J 25/13* | (2006.01) |
| *F28F 3/12* | (2006.01) |

(52) U.S. Cl.
CPC ........... *A01J 25/008* (2013.01); *A01J 25/002* (2013.01); *A01J 25/13* (2013.01); *F28F 3/12* (2013.01); *A23C 2250/10* (2013.01)

(58) Field of Classification Search
CPC ........ F28F 3/12; A01J 25/008; A23C 19/0684
See application file for complete search history.

(56) References Cited

U.S. PATENT DOCUMENTS

| | | | | |
|---|---|---|---|---|
| 3,445,241 A | * | 5/1969 | Pontecorvo | A23C 19/0684 |
| | | | | 99/453 |
| 3,570,389 A | * | 3/1971 | Pontecorvo | A01J 25/008 |
| | | | | 99/464 |
| 4,339,468 A | * | 7/1982 | Kielsmeier | A23C 19/0684 |
| | | | | 426/582 |
| 4,665,811 A | * | 5/1987 | Meyer | A01J 25/008 |
| | | | | 99/464 |

(Continued)

FOREIGN PATENT DOCUMENTS

| | | | | |
|---|---|---|---|---|
| EP | 1520481 A1 | * | 4/2005 | ............ A01J 25/12 |
| WO | WO-2013076237 A1 | * | 5/2013 | ............ A01J 25/008 |

OTHER PUBLICATIONS

Machine Translation of WO-2013076237-A1 (Year: 2013).*

*Primary Examiner* — Jacob J Cigna
*Assistant Examiner* — Michael W Hotchkiss
(74) *Attorney, Agent, or Firm* — Mandy L. Tran, Esq.; CERES Patent & Technology, LLC

(57) ABSTRACT

An inventive solution directed to the production and lamination of pasta filata type cheese ribbons, such as mozzarella, provolone and blends thereof by concurrently and continuously pulling, stretching, cooling, and molding cheese through a series of channels, preferably elongated in nature, having enclosed cavities of particular negative dimension for molding purposes. The cheese is cooled by indirect heat transfer through thermal conductive walls of the elongated channels. The cheese is allowed to set as it is formed within the cooling and molding channels. As the cheese is pulled through and out of the distal end of the elongated channels, the series of released cheese ribbons are (Continued)

combined and pulled through a second series of compression channels by which multiple ribbons are compressed together to form larger laminated strips ready for immediate packaging, storage or further processing.

4 Claims, 4 Drawing Sheets

(56) References Cited

U.S. PATENT DOCUMENTS

| | | | | |
|---|---|---|---|---|
| 4,679,497 | A * | 7/1987 | Tomatis | A01J 25/008 99/452 |
| 4,902,523 | A * | 2/1990 | Fritchen | A01J 25/12 99/452 |
| 5,480,666 | A * | 1/1996 | Lindgren | A23C 19/0684 99/464 |
| 5,527,551 | A * | 6/1996 | Fager | A01J 27/04 425/371 |
| 9,049,836 | B2 * | 6/2015 | Lindgren | A23C 19/06 |
| 2010/0173058 | A1 * | 7/2010 | Foerster | A23L 3/16 426/474 |
| 2011/0023727 | A1 * | 2/2011 | Deane | F28D 9/0075 165/4 |
| 2011/0076373 | A1 * | 3/2011 | Cretors | A23P 30/38 426/450 |
| 2012/0097048 | A1 * | 4/2012 | Tomatis | A01J 25/008 99/453 |
| 2012/0183665 | A1 * | 7/2012 | Koishihara | A23C 19/08 426/582 |
| 2012/0258226 | A1 * | 10/2012 | Lindgren | A23C 19/0684 99/455 |
| 2014/0170276 | A1 * | 6/2014 | Nelles | A23C 19/0684 426/243 |
| 2015/0147443 | A1 * | 5/2015 | Nelles | A23C 19/0684 426/241 |

* cited by examiner

METHOD AND DEVICE FOR LAMINATING LAYERS OF CHEESE

CROSS REFERENCE TO RELATED APPLICATIONS

This nonprovisional utility patent application is a continuation-in-part of the copending application, U.S. patent application Ser. No. 15/384,315, having the filing date of Dec. 19, 2016, which is a continuation-in-part application of and claims benefit from the parent application, U.S. patent application Ser. No. 13/426,397, with the filing date of Mar. 21, 2012. Accordingly, pursuant to and in conformance with the filing requirements pursuant to 35 U.S.C. 120, 37 C.F.R. 1.53(b) and all other relevant law not otherwise referenced herein, this application claims benefit of priority of the parent application, U.S. patent application Ser. No. 13/426, 397, with the effective filing date of Mar. 21, 2012.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark office, patent file or records, but otherwise reserves all copyright rights whatsoever.

BACKGROUND OF INVENTION

Field of the Invention

The present inventive subject matter relates to a method and device for laminating layers of cheese, particularly cheese of the pasta filata type.

Background

Natural cheese, particularly of the pasta filata family (including but not limited to mozzarella, provolone, or blends thereof) have plastic or elastic qualities that make it pliable for molding when heated (typically between 120° F. to 160° F.). At the same time, pliability in this heated state prevents the cheese from being self-supporting (independently hold its own weight and shape). For purposes of packaging cheese with a prescribed shape, specifically pasta filata type cheeses, it is necessary that the external layer of the block be sufficiently cool to hold its own shape and weight while the internal warmer portions be cool enough not to reheat and deform the external layer (otherwise known in the industry as "slumping"). This stage of cooling is called "setting". Once a piece of cheese has set, it is able to independently maintain a prescribed shape (be "self-supporting") and hence be ready for packaging and shelving. In practice within the manufacturing industry, core setting temperatures for standard pasta filata type cheese have ranged from above 80° F. to below 55° F.

I recently conducted a theoretical transient heat transfer study based on standard cheese physical properties provided by the UW-Madison Diary Center, illustrating its cross-sectional temperature profile after 10 minutes of cooling in salt brine solution. For a standard 4×4 inch six pound block of cheese submersed in 32° F. brine solution for 10 minutes, theoretical results reveal the outermost layer reaching an ambient temperature of 32° F. while the inner core temperature remains at approximately 140° F. These numbers reflect actual temperature ranges found in current manufacturing processes under similar conditions. The calculations were based on a 4×4 inch square six pound block of cheese with thermal conductivity of 0.332 W/mK and specific heat of 3 kJ/kgK, theoretically in direct contact with 32° F. brine solution for exactly 10 minutes.

In particular, the theoretical heat study revealed a temperature profile for seven external cross-sectional layers (⅝ inch thick each) surrounding a thicker inner core of a 4×4 inch cheese block. The profile shows seven temperature ranges (rounded to the nearest degree) from inner core to outer surface on a per layer basis: 1) 140° F. to 125° F., 2) 125° F. to 109° F., 3) 109° F. to 94° F., 4) 94° F. to 78° F., 5) 78° F. to 63° F., 6) 63° F. to 47° F., 7) 47° F. to 32° F. The outside "skin" (according to the study, being the outermost layer in contact with the external environment) cools relatively quickly given greater surface area exposure to cooling agents. The skin is able to cool from an initial temperature of 140° F. to 32° F. within 10 minutes of submersion in 32° F. brine solution. The interior core, however, experiences negligible temperature change in the same period of time. Typically, the speed of cooling and setting is based in significant part by the thermal conductivity of the cheese, driving overall cooling time. According to this study, the cross-sectional outer half of the 4×4 inch cheese mass reaches an average temperature of approximately 66° F. (rounded to the nearest degree) after 10 minutes of submersion in the 32° F. cooling medium while the inner half may require at least 4 to 5 hours or more to reach the same temperature.

Industry standards provide certain dimensional requirements for the manufacture of cheese blocks. One industry standard provides for a 20 pound block of cheese that is 20 inches long, 4.5 inches thick and 8 inches wide. Another standard sized loaf provides for a 5 pound block of cheese that is 4 inches wide, 4.5 inches thick, 10 inches long. Standard manufacturing techniques for the production of large pasta filata type cheese blocks require multiple steps in forming and cooling each block. Typically, these large blocks are shaped in molds and partially cooled to a desirable exterior temperature sufficient to hold shape in suspension. The blocks are then consolidated into a cold brine bath and buoyed through cooling bath channels for up to 12 hours.

This multi-stepped technique of separately forming and cooling the cheese blocks results in substantial loss of time and space as well as loss of inherent desirable qualities within the cheese. Extensive floor space is required to accommodate each separate step of the process. Extensive time (as long as 12 hours depending on the size of the block) is required to set the cheese in liquid cooling medium. The blocks quickly lose their shape when released too soon from their molds and allowed to travel unguided through brining channels. The extensive time submersed in brine solution results in substantial loss of butterfat, uneven salting of the cheese blocks, loss of shape from impact with other surfaces and increased risk of contamination.

The initial steps of forming cheese (stretching and shaping) in manufacture typically involves extrusion of a nascent cheese mass through a screw device, forcing them into molds. The extrusion method tends to excessively work the cheese, cutting into cheese fibers and internal pockets that naturally retain fat, moisture and flavor. This results in loss of flavor, change of texture and decrease in overall mass. The technique goes contrary to suggested methods for forming cheese by those in the art. The best method of stretching and separating cheese is by pulling rather than pushing and pinching rather than cutting, for reasons discussed above. Under current large scale manufacturing processes, the final product tends to be far from the pampered perfection of hand crafted cheese, applying techniques solely to accommodate the manufacturing scenario.

U.S. Pat. No. 5,480,666 attempts to reduce cooling time by providing a method that takes advantage of surface area cooling and the cheese's inherent ability to fuse by lamination. Pasta filata type cheese is extruded through rollers onto a conveyor belt where the flatten sheet(s) is cooled directly with a liquid cooling medium. The wide surface area and thinner cross-sectional dimensions of each sheet allows it to cool comparatively faster than a block of cheese of standard industry size. Once cooled, the sheets are sliced into ribbons, stacked and allowed to laminate (stacked and fused together into one continuous mass) to produce standard sized blocks. This method suggests increased cooling time per standard block of cheese. The problem still remains for the need to directly expose the cheese to a cooling medium, increasing the risk of exposure to contaminants. Further, the technique inherently requires extrusion of the cheese mass onto the conveyor, altogether compromising the quality of the cheese. Lastly, there is a question of accuracy in shaping the blocks of cheese since there is little molding occurring throughout.

Notably, Patent No. '666 fails to mechanically adapt to the differences in texture and consistency between processed cheese (having little material strength) and pasta filata type cheese (having high material strength and elasticity). Rather, it borrows in part from existing methods and technology for the manufacture of processed cheese slices, such as U.S. Pat. Nos. 2,352,210, 3,479,024, and 3,887,719. Patent '666 suggests a similar method for manufacturing pasta filata type cheese as is applied for producing processed cheese slices without further accommodating slumping issues related to pasta filata cheese not otherwise seen in warm processed cheese. The natural elasticity and slumping effect of warm pasta filata type cheese, or any natural cheese with inherent elastic quality, prevents it from maintaining a defined shape on its own (self supporting and outside of a mold) while in a warm state. The natural slumping of warm pasta filata type cheese requires cooling within a rigid mold to set the cheese to a defined shape. Patent '666's failure to address the slumping effect of pasta filata type cheese renders it impractical to real life application. For the above given reasons, the two step process of cooling in molds and subsequently in brine baths remains the popular method.

U.S. Pat. No. 4,626,439 attempts to improve existing manufacture methods for shaping pasta filata type cheeses. Accordingly, the cheese mass is extruded onto a conveyor belt and flattened by rollers into thin sheets. The sheets are kept warm to maintain pliability during the rolling process. The edges of the sheets are trimmed to desired dimensions and excess pieces are reused. The cheese is kept warm through trimming to preserve excess pieces for reuse. Cooling begins immediately after trimming to quickly set the cheese and to maintain the trimmed dimensions. This process acknowledges the material consistency issues of pasta filata type cheese and provides an alternative method for shaping the cheese. The cooling process in this patent involves immersion of trimmed sheets in cold brine solution. Once set, the final third stage of shaping begins. The cheese sheets are shaped by slicing, dicing, shredding or cookie cutting. As before, the problems provided above remains unresolved in this patent. The cheese is processed by method of extrusion, affecting quality of the cheese. Cooling by direct contact with a liquid cooling medium for extensive time increases risk of contamination, causes uneven salting, and results in loss of moisture. Reuse of trimmed material results in over-processing and decrease in flavor and moisture content. Lastly, the additional third step likely calls for additional floor space to accommodate additional tooling.

U.S. Application No. 2009/0226580 A1 similarly extrudes the cheese mass onto a conveyor surface where the mass is rolled into thin sheets. Alternatively, the sheets are cooled directly on the conveyor with super cooled air and a cooled conveyor surface. This eliminates the need for direct contact with a liquid cooling medium. Since the sheets are directed for immediate comminuting (cut into smaller shapes such as by slicing, dicing or shredding), shape is of no concern. Therefore, the initial step of partial cooling in molds is eliminated and the cooling process is sped up by taking full advantage of surface area cooling. This is an acknowledgment that the technique of molding, or lack thereof, of pasta filata type cheese significantly impacts cooling time efficiency. The problem described above remains unresolved in patent application '580 as well. As before, the cheese is processed by extrusion, which can overwork the cheese and compromise its quality. Further, the cheese is exposed to the open air environment to maximize surface area cooling, thus increasing risk of contamination. Lastly, the application provides no technique for shaping the cheese, making it inapplicable to the manufacture of cheese blocks, sticks or other molded forms.

Thus, there remains a considerable need for inventive solutions that improves upon the quality and speed of cheese molding and manufacture. All patents and applications referred herein are incorporated by reference in their entirety. Furthermore, where a definition or use of a term in a reference, which is incorporated by reference herein is inconsistent or contrary to the definition of that term provided herein, the definition of that term provided herein applies and the definition of that term in the reference does not apply.

SUMMARY OF THE INVENTION

An inventive solution directed to the production of pasta filata type cheese, such as mozzarella, provolone and blends thereof by concurrently and continuously pulling, stretching, cooling and molding cheese through a series of channels, preferably elongated in nature, having enclosed cavities of particular negative dimension for molding purposes. The cheese is cooled by indirect heat transfer with a cooling medium through thermal conductive walls of the elongated channels. The cheese is allowed to set as it is formed within the cooling and molding channels. As the cheese is pulled through and out of the distal end of the elongated channels, the series of released cheese ribbons are combined and pulled through a second series of compression channels by which multiple ribbons are compressed together to form larger laminated strips of newer dimensions ready for immediate packaging or storage.

One embodiment of this inventive concept may include the following series of events: Placing cheese in a heated, deformable or pliable state in a trough. The cheese is guided towards a series of narrow elongated channels, tunnels or lanes, preferably fluidly coupled to one another in adjacent fashion. Each channel has an open proximal end for receiving the warm cheese mass and an open distal end for releasing the formed cheese ribbons. Guiding means positioned between the trough and each channel guides and divides the cheese mass into portions per channel. Each channel is enclosed on all sides other than the proximal and distal ends to form an internal cavity. The internal cavity comprises a negative space of defined cross-sectional shape and dimension along the length of the channels. The negative space may be narrow at one or more location along the length of each elongated channel to create pressure points for stretching the cheese as it passes. The side walls of each internal cavity have an internal side facing the negative space and an external side facing the external environment. The side walls of each elongated channel are thermally conductive. The difference in temperature between the external environment and the internal cavity defines a preferred thermal gradient. The thermally conductive side walls being in contact with the cheese on the inside and a cooling medium on the external side facilitate heat exchange between the walls. The cheese may avoid direct contact with the cooling medium in this particular scenario.

The internal cavity of each channel contains a pulling mechanism that follows the length of each channel and moves continuously along the internal cavity from proximal end to distal end. The pulling mechanism is exposed on the proximal end (and optionally from the distal end) of each channel so that it may directly contact the warm cheese mass and pull the cheese from the trough into each channel. The pulling mechanism may comprise any known means for gripping onto soft pliable and elastic material of varying levels of moisture that is also large in mass and volume with minimal slippage. The preferred pulling mechanism would be able to quickly grip onto a portion of said cheese mass and pull the mass directly into and through the length of each channel's internal cavity from proximal end to distal end. The pulling mechanism may be adjusted for rate of speed of lengthwise movement. The rate of the pulling speed and the narrowness of the internal cavity relative to the diameter of the cheese mass immediately at the point where the cheese is pulled through, defines the amount of stretching pressure applied against the cheese at that particular location.

The pulling mechanism may be any means or technique known in the art. In the preferred embodiment, the pulling mechanism comprises a rotating belt system. The belts rotate lengthwise from proximal end to distal end (or vice versa), looping around the internal and external sides if the channel sidewalls, resulting in a continuous looping motion around the channel's side wall. There may be multiple belts looping through the cavity of each channel. The rotating belts are thermally conductive. The belts are in direct contact with the channels' inside cavity wall and the cheese mass or ribbons. As the cheese is pulled through the length of each channel cavity, filling said cavity, it is molded to the shape of the channel's internal cavity. The belt should be sufficiently flexible and flushed against the internal cavity wall so as to not interfere with the process of molding the cheese to the cross-sectional shape of the cavity walls. The belt should hold its grip over the cheese through the entire length of each channel. The belts are preferably comprised of a solid, durable (having minimal stretch), flexible, non-flaking food grade material for purposes of cheese molding and food handling.

Movement of the pulling mechanism is activated by an actuating mechanism. Said actuating mechanism can be any method or technique known in the art. Preferably, the actuating mechanism enables the pulling mechanism to move from the proximal to distal direction and or distal to proximal direction, at the user's choice. The rate of speed by which the pulling mechanism moves may be adjusted through the actuating mechanism. The actuating mechanism may comprise but is not limited to such means including manual, electro-mechanical, electro-magnetic or computer controlled belt systems. In one embodiment, the actuating means comprises a series of SS belts strategically looped over a series of cog wheels, several of the cog wheels being dually connected to the rotating belts of the pulling means. Rotation of the SS belts activates rotation of the dually connected cog wheels, resulting in directional movement of the rotating belts of the pulling means. Alternative embodiments to the actuating means may include and not be limited to electro-mechanical or electro-magnetic means for rotating the individual cog wheels.

The external sides of each channel side wall are in contact with an external environment of a preferred constant temperature. The external environment is the general area external to the channel's internal cavity comprising a new environmental component or element (i.e. different temperature, different composition, etc.) which may or may not be an open environment and can be a confined environment, such as cooling pipes or panels. A cooling mechanism is in immediate contact with the channel's external side walls. The cooling mechanism may comprise a cooling medium of any combination of solid, liquid or gaseous medium or a thermal conductive container containing and facilitating a constant flow of the cooling medium. Said container may comprise, but is not limited to, the following known devices or techniques such as grooved channeling panels, thermally conductive pipes or tubing that can facilitate heat transfer between its own wall and the walls of the elongated channels. The temperature of the cooling mechanism may be adjusted to be higher or lower than the temperature within the channel cavity. The cooling mechanism may comprise a single continuous piece or alternatively several sectional pieces that coupled together along the length of the channel on the external side of the channel wall. The cooling mechanism may alternatively comprise super cooled gas or liquid suspended in an open environment directly contacting the channel side walls. In any case, any known manner in the art for creating a temperature gradient between the channel's internal cavity and immediate external environment may be embodied in this invention to accomplish cooling by thermal conductive heat transfer through the channel wall.

Proper setting of the cheese ribbons will depend on period of exposure between the cheese surface and the cooling walls of the elongated channels. Setting time is further dependent on the temperature gradient between the cheese and the external environment and the amount of cheese surface area in contact with the cooling side walls. Ultimately, the rate of speed in which the cheese ribbons are pulled through relative to the length of each channel will determine the period of exposure. The channels may be adjusted in length and the rotating pulling belts may be adjusted for speed to establish a preferred period of exposure of the cheese to the cooling environment. Ideally, the cheese strips, having sufficiently large surface area that is exposed to a wide temperature gradient for sufficient time will quickly cool and set within the confines of the elongated channels before being released from its distal end.

Preliminary tests of this inventive subject matter using the preferred embodiment discussed below as described in detail reveal significant improvement in the cooling and molding process. A nascent warm pliable cheese mass was placed in the trough and pulled through a 5/8"x by 4" rectangular cavity opening. The cooling mechanism facilitated a continual flow of 54° F. water. The initial temperature of the warm cheese mass at the start was 144° F. Within minutes after pulling the cheese from proximal end to distal end, the internal core temperature of the 5/8" by 4" thick cheese ribbon reached 83° F. and the cheese became self supporting. The flavor of the final cheese product did not change despite the cooling and molding process. The cheese mass and ribbon never came in direct contact with the cooling medium throughout the length of the channel. The final product contained sufficient density of cheese fibers when torn apart by hand, evidencing effective stretching of the cheese mass within the channels.

By pulling the warm cheese through the series of narrow channels, the cheese is continuously and concurrently stretched, shaped, and cooled to set within the length of each enclosed channels in relatively short time. The continuous and concurrent nature of this technique allows for constant production of high quality cheese with minimal space requirement. Cooling by thermal conductive heat transfer eliminates the need for separately cooling and molding, eliminating the brining process entirely. As such, a novel technique for high volume production of cheese of handcrafted quality is established herein.

Another embodiment of this invention provides for a series of compression channels or chambers fluidly connected to the distal ends of the elongated channels described above. Ribbons of cooled and set cheese released from the elongated channels are guided towards the proximal ends of the compression channels by a guiding mechanism. Multiple cheese ribbons enter each compression channel where they are pulled through with a pulling mechanism and compressed to laminate at narrow portions within the internal cavity of each compression channel. The compression channels are completely enclosed on all sides, other than the proximal and distal ends, to form an internal cavity with a negative space of defined shape and dimension. The cross-sectional space of the internal cavity at one or more location being narrower than the perimeter of the several cheese strips combined for purpose of compression and lamination. The negative space within the compression channels is continuous from the proximal end to the distal end. Each compression channel having pulling mechanisms and cooling mechanisms of the same or similar construction and functionality as described above for the elongated channels. As described above for the elongated channels, the side walls of the compression channels may also be thermally conductive and in contact with a cooling mechanism on its external side. However, cooling may not be required at this stage of molding and its absence in the compression channels may be an alternate embodiment to this invention.

As the cheese ribbons are pulled through each compression channel, they are compressed and laminated together to form a larger ribbon of cheese with defined shape. The core temperature of the larger laminate ribbon is equivalent to or lower than the core temperature of the individual cheese ribbons released from the distal end of the elongated channels. As in the preliminary test discussed above, the core temperature of a standard sized block that is approximately 2 inches wide by 4 inches long, cooled at 54° F. along the length of the elongated channel may decrease to 83° F. or lower after release from the compression channels. This alternative embodiment is ideal for continuous production of industry standard large sized cheese products or blocks. Note that nearly any desirable cross-sectional shape and size may be achieved by the above described process of this invention.

Recent experimentation of the lamination phase of this process reveal a quality differential. A resulting lamination does occur from the process described above wherein the formed pasta filata cheese ribbons pass from the elongated channels in cooled form and through the compression channels. However, the formed cheese ribbons at the distal end of the elongated channels, having achieved an ideal cooled state on their external surface layer embody a physiological buffer that leads to a less than continuous connection and eventual delamination at their contact surfaces post lamination. Visual imperfections such as a seam located at the point of surface contact is also a problem. Experimentation wherein the surfaces are reheated by introduction of external heat over the ribbon surface tends to revert the ribbons to a deformed state and as such, lamination becomes messy and inconsistent. It is discovered through further study into this problem that the cheese ribbons should, for the most part, be in a cooled molded state during the lamination process for efficient and consistent shaping of the final product according to this method of lamination by passing through a compression channel. The problem remains in determining a method by which the lamination of two strips or two pieces of cooled and molded pasta filata cheese may be laminated through this compression method to result in a completely fused bond that will not delaminate at their contact surfaces.

Experimentation into this matter lead to an ideal solution and improvement to the disclosed technology of this invention. The improved elements of this invention therefore further comprising an electrode element positioned at either the distal end of said elongated channels or at the proximal end of said compression channel (or anywhere in between these two ends where the cheese passes there between) such that the electrode would be in direct contact with the surface of said cheese ribbon to pass an electric current through the entire cheese ribbon before or as it enters the compression channel. A thermo-couple indicator and reader is also positioned nearby the electrode at either the proximal or distal ends of the compression channel or within the channel itself for the main purpose of reading the temperature of the cheese ribbons that are being laminated. Variations to the level of electricity conducted will result in higher or lower cheese ribbon temperature. According to these experimentations, cheese temperature equal or below 110 degree Fahrenheit will not bond well while temperatures equal to or above 120 degree Fahrenheit will effectively allow the cheese surfaces to fuse in continuous manner at the ribbon surfaces without a noticeable seam at the location of attachment nor the potential risk of delamination. The method of this process provides that the formed and cooled cheese ribbons passing from the distal end of each said elongated channel will be contacted with a live electrode that will conduct sufficient level of electric current therethrough to heat the cheese ribbon surface optimally at or near 120 degree Fahrenheit. This temperature being measured by thermo-couple feed-back. The surface temperature of the cheese ribbon should be maintained at 120 degree Fahrenheit as it passes through the compression channel. However, upon reaching this temperature at the cheese ribbon surface, the conduct of electric current should cease so as to avoid reheating of the internal portions of the cheese ribbons and ultimate denaturing of the pre-formed shape. The effective temperature for this purpose is above 110 degree Fahrenheit and no greater than 160 degree Fahrenheit, preferably at or near 120 degree Fahrenheit.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

Reference will now be made in detail to exemplary aspects of the present invention which are illustrated in the accompanying drawings. Wherever possible, the same reference numbers will be used throughout the drawings to refer to the same or like parts.

Figure 1A:
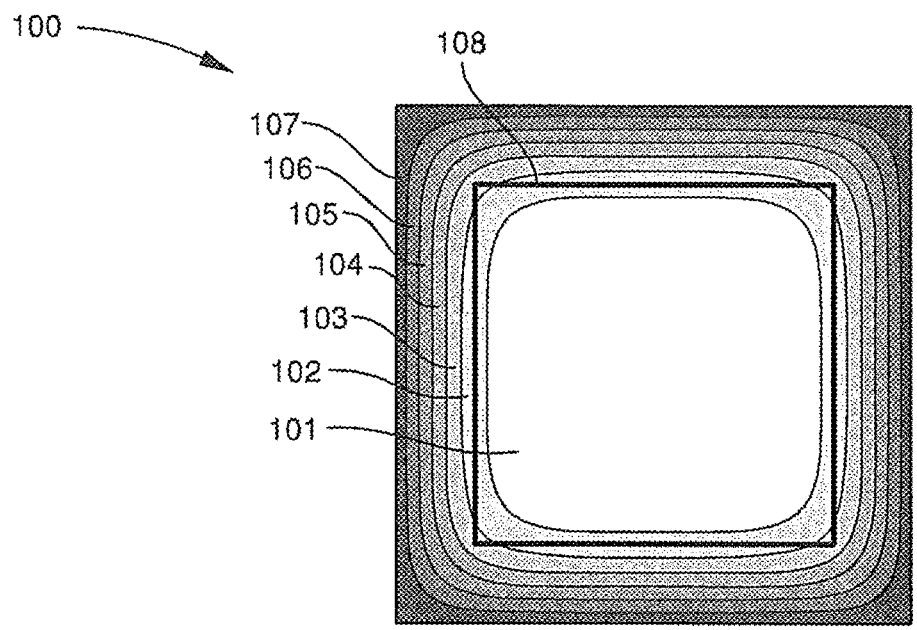
FIG. 1A is a plan view cross-sectional thermal profile of a cheese block illustrating cooling efficiency problems within the current art.
Figure 1B:
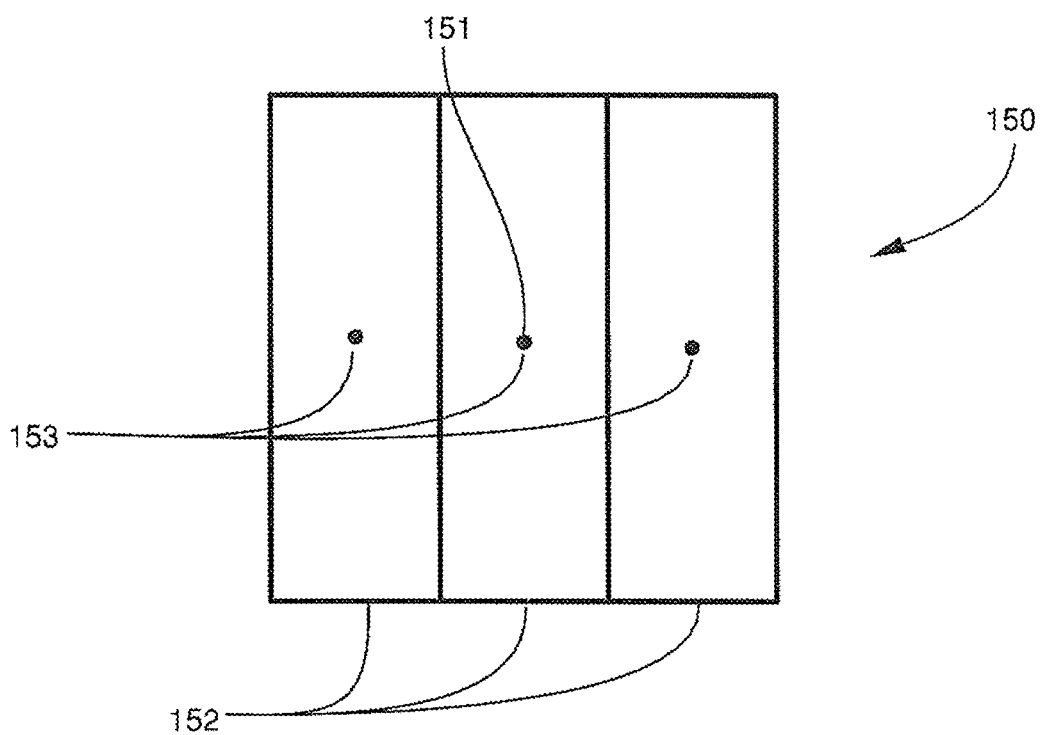
FIG. 1B is a plan view cross-sectional thermal profile of three laminated cheese ribbons in accordance with an embodiment of the present invention.

FIG. 1A is an illustration of a theoretical transient heat transfer study of cheese illustrating a cross-sectional temperature profile for a standard 4×4 inch six pound block 100 of cheese submersed in 32° F. brine solution for 10 minutes. The calculations were based on thermal conductivity of 0.332 W/mK and specific heat of 3 kJ/kgK. The theoretical heat study revealed a temperature profile for seven external cross-sectional layers (⅝ inch thick each) surrounding a thicker inner core of a 4×4 inch cheese block 100. The profile shows seven temperature ranges (rounded to the nearest degree) from inner core to outer surface on a per layer basis: 1) 140° F. to 125° F. (101), 2) 125° F. to 109° F. (102), 3) 109° F. to 94° F. (103), 4) 94° F. to 78° F. (104), 5) 78° F. to 63° F. (105), 6) 63° F. to 47° F. (106), 7) 47° F. to 32° F. (107). The outside "skin" 107 (according to the study, being the outermost layer in contact with the external environment) is able to cool from an initial temperature of 140° F. to 32° F. within 10 minutes of submersion in 32° F. brine solution while the inner cross-sectional half of the cheese block mass (illustrated by the dark line 108) requires at least 4 to 5 additional hours to cool to set. In contrast, FIG. 1B shows a cross-sectional profile of three cheese ribbons 152 (each ⅝ inch by 4 inches in dimension) laminated together 150 to form a larger ribbon of approximately 2 inches wide by 4 inches long. The core temperature 151 of the larger ribbon 150 is equal to or lower than the core temperatures 153 of each single ribbon composites 152. For my preliminary study, when exposing the singular ribbons 152 of mozzarella cheese to a constant cooling temperature of 54° F. while being pulled through the elongated channels, the core temperature cooled to approximately 84° F. within minutes as it reached the proximate ends of the channels. The core temperature 151 of the final laminated block 150 was also approximately 84 F°, ready for immediate packaging without need for further cooling.

Figure 2A:
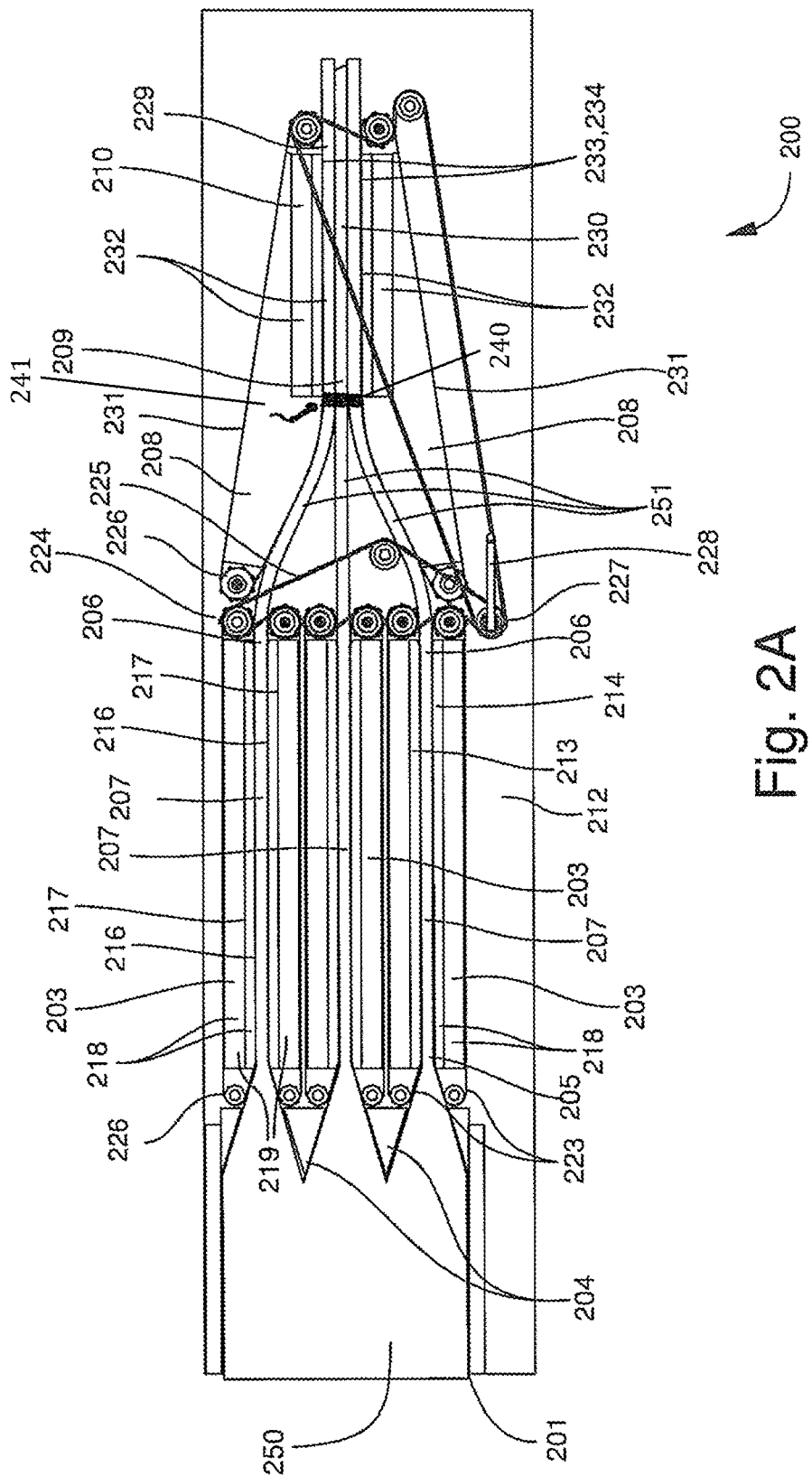
FIG. 2A is a plan view of the inventive subject matter in accordance with an embodiment of the present invention.

FIG. 2A is an illustration of an exemplary embodiment of the inventive subject matter 200. This embodiment having a receiving chamber 201 or a trough for receiving the nascent warm cheese 250, a series of three elongated channels 203 and several guiding means 204 located between the trough 201 and the proximal end 205 of said elongated channels. Alternate embodiments of the invention may have fewer or greater numbers of elongated channels within each series than is depicted herein. The image of the elongated channels 203 of FIG. 2A does not provide for an accurate depiction of length but suggests only a length sufficient to accomplish the purpose of said invention. The length of each channel 203 may be adjustable to the user's preference. Each elongated channel may comprise one single length of channel or a series of fluidly connected channel sections to create the desired length of channel. The guiding means 204 may also vary in quantity, shape and positional placement, depending on the action it is intended to achieve. In the immediate embodiment of FIG. 2A, the guiding means 204 comprises a simple triangular shaped immobile wedge seated on the proximal side of the channel opening 205, for the purpose of guiding and portioning (via the sharper protruding edge) the nascent cheese mass 250 into the channel cavities 207. In contrast, the guiding means 208 located beyond the distal end 206 of said elongated channels 203 in the preferred embodiment of FIG. 2A comprises an oblong shaped wall integrated together within the proximal end 209 of the compression channel 210 purely for the purpose of corralling and guiding the long cheese ribbons 251 released from the elongated channels 203.

According to the embodiment of FIG. 2A, each elongated channel 203 is open on the proximal end 205 to receive the cheese mass and the distal end 206 to release formed and cooled cheese ribbons 251. Each elongated channel 203 is covered on all other sides by contiguous side walls (referred to cumulatively as the side walls 215, shown in part herein the bottom 212, left 213 and right 214 sides, top side not shown) to form an internal cavity 207. The internal cavity comprises a negative space of defined cross-sectional shape and surface area (not shown). According to the embodiment of FIG. 2A, the side walls may form a rectangular or square shaped negative space. Alternate embodiments of the elongated channels 203 may have internal cavities 207 and negative spaces of nearly any cross-sectional shape. The internal cavity 207 may be shaped to be narrower at certain locations along the length of the channels to create additional pressure points for stretching the cheese.

The side walls 215 of each channel illustrated in FIG. 2A includes a top (not shown), bottom 212, right 214 and left side 213 surfaces. The bottom side wall in this particular embodiment comprises a large flat surface 212 that seats the entire device, creating a tight sealed connection with the left 213 and right side 214 walls of the elongated channels (among other parts of the device), thus acting dually as the bottom side wall 212 to the channels of the device. Again, alternate embodiments of this invention may have just one continuous side wall, particularly if the internal cavity is circular or oval with no corners or angles. In the depicted embodiment of FIG. 2A, the top wall surface may be a simple flat top cover, such as but not limited to glass, food grade plastic, or food grade metal, forming a fluid connection with the channel's right 214 and left 213 side walls. The bottom side 212 wall may be a simple base surface composed of the same food grade material as the rest of the channel side walls 215, fluidly connected to the channel's left 213 and right 214 walls. The material composition of the channel side walls 215 is preferably food grade, solid, nonporous and non-flaking. Further, one or more side walls 215 should be thermally conductive and have the same level of thermal conductivity as the cheese mass.

Figure 2B:
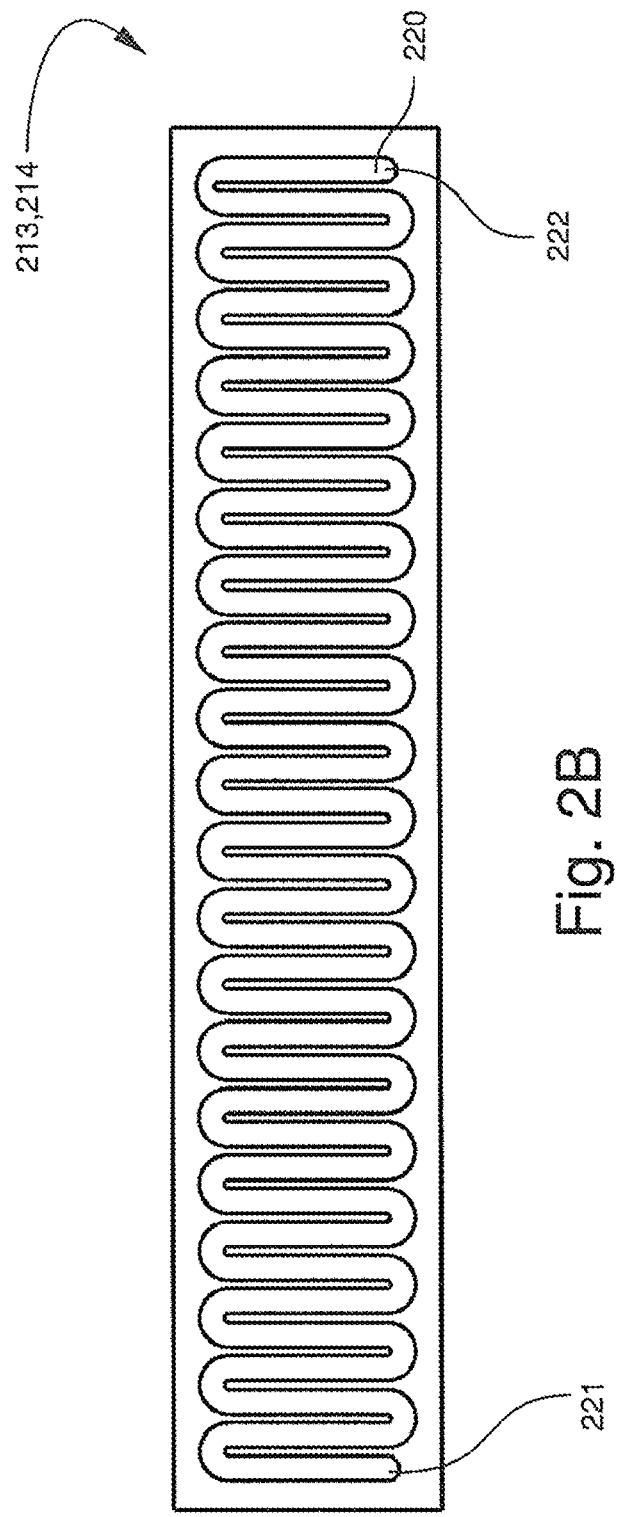
FIG. 2B is a plan view of a serpentine panel in accordance with an embodiment of the present invention.

The side walls 215 of each elongated channel 203 have an internal side facing 216 the internal cavity 207 and an external side facing the external environment, opposite the internal cavity 207. The external side of the top side wall (not shown) of FIG. 2A faces the top ambient environment. The external side of the bottom side wall 212 of FIG. 2 faces the bottom ambient environment, assuming the device is positioned above ground level. The external sides 217 of the right 214 and left 213 side walls of FIG. 2A faces a series of cooling mechanisms 218 that facilitate continuous flow of a cooling medium (not shown). The cooling mechanism 218 comprises a cooling block 219 of similar dimensions as the channel side walls 215, receiving water through a piping system (not shown) and facilitates a flow of cold medium. The cold medium may comprise any combination of solid, liquid and or gas. In the embodiment of FIG. 2A and the exploded view of 2B, the external side of the channel's left and right side walls 213, 214 further possess grooved serpentine channels 220. The serpentine channels are exposed on the external side facing the cooling block 219. When pressed against each other, the cooling block 219 and the serpentine channels 220 of the channel's external side walls 213,214 form a water tight seal. Cold water received from a piping system through the cooling block is directed into one end 221 of the serpentine channels and out of the other end 222 of the serpentine channels where the water is recalibrated to the desired temperature at the originating source. The continuous flow of cooling medium against the channel side walls 213, 214 helps to maintain a constant temperature gradient for purposes of efficient cooling inside the channel cavity. The serpentine channels 220 may alternatively be incorporated into the cooling block 219 to achieve essential the same results, which is the facilitation of cold medium against the external surface 217 of the channel side walls 213, 214. The cooling mechanism 218 may alternatively comprise a series of tubing carrying chilled medium, where the tubing wall is in contact with the channel external side walls 217. In such instance, the tubing wall (not shown) should be highly thermal conductive to ensure optimum heat transfer between the chilling medium and channel's internal cavity 207 through two layers of walls (the tubing wall and the channel wall).

The channel side walls may be further composed of either multiple serpentine channel panels (see FIG. 2B) interconnected together to form a desired length of elongated channel 203 or simply one single panel of a desired length. In either case, the user should be able to vary the temperature settings at different locations along the channel length. The cooling mechanism 218 in generally should also be comprised of solid, nonporous, food grade material that is thermally conductive, preferably at the same level of thermal conductivity as the cheese mass.

According to the preferred embodiment of FIG. 2A, a cooling temperature gradient is created between the external side 217 and internal side 216 of each channel side wall. As the cheese 250 passes through the length of each channel's internal cavity 207, it is quickly cooled. Given the wide surface area of the cheese ribbons 251 that is in direct contact with the channel's cool internal walls 216, the external and internal cross-sectional layers of the cheese ribbons 251 quickly cool to setting temperatures. The rate of cooling will depend on period of exposure of cheese ribbons of a given cross-sectional size to a preferred temperature gradient. The period of exposure is further dependant on the rate of speed in which the cheese ribbon is pulled through each channel and the length of the channel itself. Thus the dimensions of the channels should be adjustable to accommodate and control cooling time.

The preferred embodiment of FIG. 2A depicts an internal cavity 207 in contact with a pulling mechanism that follows the length of each channel 203, moving continuously alongside the internal walls 216 from proximal end 205 to distal end 206. The pulling mechanism may comprise any known means for gripping onto soft pliable and elastic material of varying levels of moisture that is also large in mass and volume. The preferred pulling mechanism would be able to quickly grip onto a portion of said cheese mass and pull the mass directly into and through the length of each channel's internal cavity 207 from proximal end 205 to distal end 206. The pulling mechanism 223 of the preferred embodiment of FIG. 2A comprises one or more rotating belts 223 looped around each elongated channel 203 from proximal 205 to distal ends 206 through the internal cavities 207 of each channel. The belts of the pulling mechanism depicted in FIG. 2A are pulled forward from proximal 205 to distal end 206 in continuous motion by a cog belt system 224. The cog belt system comprises just one of many known and standard actuating means that can activate the pulling mechanism in the manner intended herein. In the device illustrated in FIG. 2A, SS belts 225 are looped over a series of cog wheels 226. Several of said cog 226 wheels strategically positioned at the proximal and distal ends of the elongated channels and compression channels where the rotating belts 223 of the pulling mechanism are dually looped around and below the SS belts 225. Rotation of a central cog wheel 227 (by hand lever 228 or motor drive, etc.) where the SS belts 225 converge results in rotation of the entire SS belt system 225, forcing directional movement of the cog wheels 226 and in turn, resulting in tandem rotation of the rotating belts 223 of the pulling mechanism. The actuating means may further control the rate of speed in which the pulling mechanism moves, controlling the degree of stretching at pressure points along the internal cavity 207 of the channels 203.

The rotating belts 223 in general should be thermally conductive. The belts 223 are in direct contact with the channels' 203 inside cavity wall 216 and the cheese mass 250, 251 and ribbons. As the cheese is pulled through the length of each channel cavity 207, filling said cavity 207, it is molded to the shape of the negative space. The belt 223 should hold its grip over the cheese mass 250 and ultimately the cheese ribbon 251 through the entire length of each channel 203. The belts 223 are preferably comprised of a solid, flexible, durable, non-stretching and non-flaking food grade material for purposes of cheese molding and food handling.

The distal ends 206 of the elongated channels 203 in the preferred embodiment of FIG. 2A releases ribbons of cheese which are further directed into a second series of channels, the compression channels 210, for additional molding via pressing and lamination. FIG. 2A provides for only one compression channel 210, but the invention may alternatively provide for multiple compression channels 210 in fluid connection in order to achieve the particular manner of manufacture desired. The compression channel 210 of FIG. 2A has elongated guiding means 208 fluidly connected its proximal end 209, guiding and directing multiple ribbons of cheese 251 towards a narrow compression channel 210. Since the ribbons 251 may have already been cooled to set by this stage, no further cooling may be required but cooling means may be added to the compression channels 210 in the same manner of construction as with the elongated channels 203, to achieve specific molding temperatures. The compression channels 210 are completely enclosed on all sides, other than the proximal 209 and distal ends 229, to form an internal cavity 230 with a negative space of defined shape and surface area (not shown). The cross-sectional space (not shown) of the internal cavity 230 at one or more location being narrower than the perimeter of the several cheese strips combined for purpose of compression and lamination. The negative space within the compression channels 210 is continuous from the proximal end 209 to the distal end 229. Each compression channel 210 having pulling mechanisms 231 and cooling mechanisms 232 of the same or similar construction and functionality as described above for the elongated channels. In the preferred embodiment of FIG. 2A, the compression chamber side walls (referred to cumulatively as 235, comprising a bottom 212, left 234, right 233, and top not shown) should also be thermally conductive, preferably to the same level of the cheese ribbons. The actuating means for the compression channel 210 as depicted in FIG. 2A is coextensive with that of the elongated channels 203, activated by the same source through interconnected SS belts 225. However, the actuating means need not be coextensive between the two series of channels 203, 210.

Figure 3:
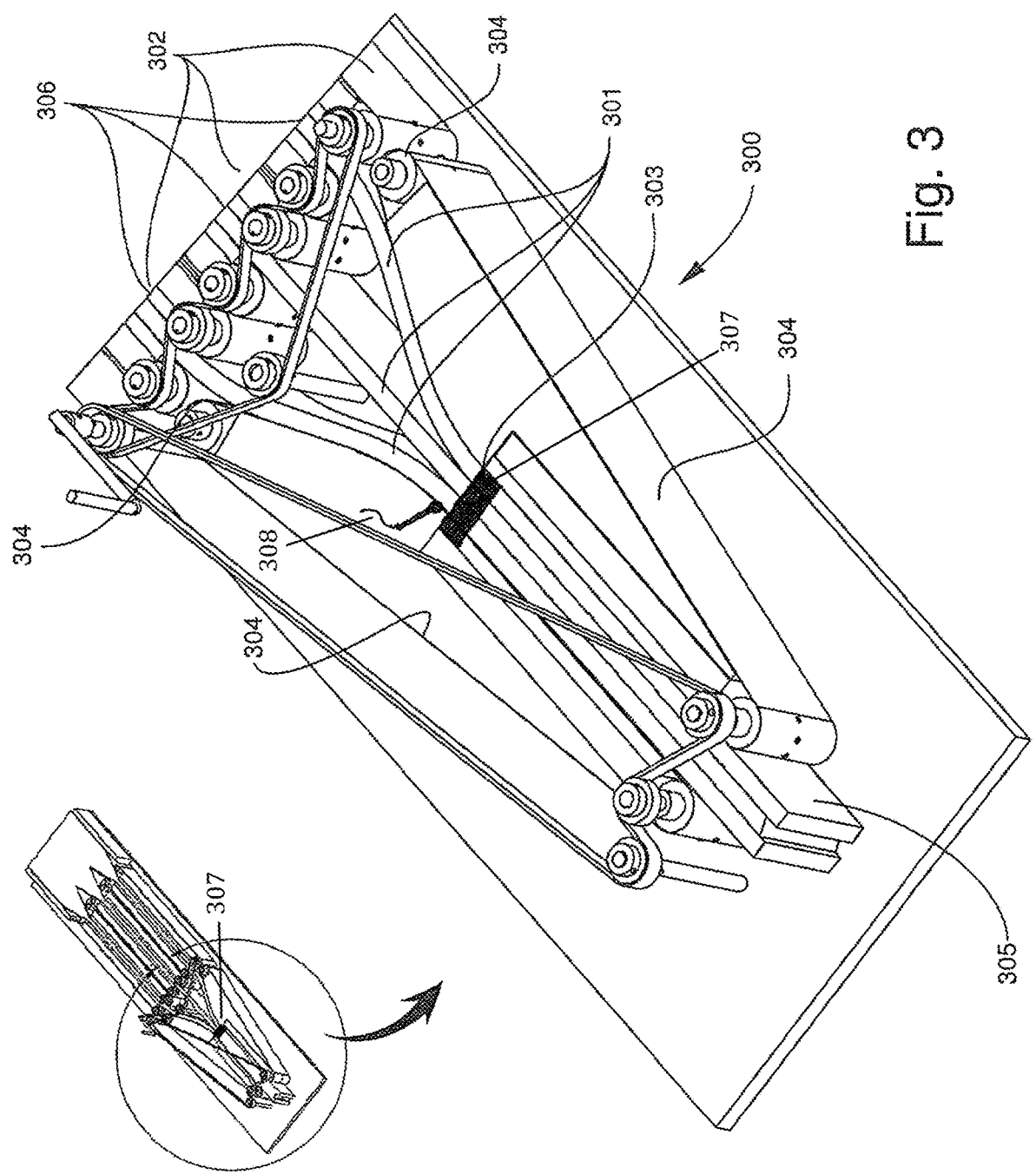
FIG. 3 is an exploded three dimensional top and front side view of the compression channel in fluid connection with the distal ends of the elongated channels in accordance with an embodiment of the present invention.

Optionally, an electrically conductive element is provided at a location between the distal end of the plurality of elongated channels and the proximate end of said compression channels. The electrically conductive element may be embodied in the form of an electrically conductive plate or probe in contact with the surface of the cheese ribbons entering the compression channels. The electrically conductive element may be positioned anywhere along the top, left, right, or bottom sides of said device relative to the compression channel and may further be adjacently positioned to the distal end of said compression channel in either connected or disconnected manner. Closely adjacent to said electrically conductive element is further a remote thermocouple temperature reader that is in contact with the cheese ribbon at or near it's point of contact with the electrically conductive element. The thermocouple temperature reader relays the surface temperature of the cheese ribbon surface as affected by the electrically conductive element. The thermocouple reader preferably being connected to said electrically conductive element by electro-digital manner via a central computer process device such that the thermocouple temperature reader relays real time temperature to a central computing processing device which is preconfigured to turn on and off electrical signals through said electrically conductive element as means of automatically controlling the surface temperature of the cheese ribbon at a desired pre-set level. The relationship between the electrically conductive element, the thermocouple temperature reader, and the central computing processing device may be completely remotely and wireless connected or may be partially wirelessly connected. FIGS. 2A and 3 show one embodiment of the electrically conductive element 240, 307 and thermocouple temperature reader 241, 308. However, alternative embodiments may also exist for either of these items 240, 307 and 241, 308 in the forms of probes, plates, wires, ribbons, etc. in which direct continuous contact (but preferably not penetrate) with the surface of the cheese ribbons is achievable.

FIG. 3 depicts an exploded view of an exemplary embodiment of the compression channel 300 where cheese ribbons 301 are released from the distal ends 306 of the elongated channels 302 pulled into the proximal end of the 303 compression channel 300 by a rotating belts 304 of a pulling mechanism, and are compressed and laminated together to form a larger ribbon 305 of cheese with defined shape. The surface temperature of the cheese ribbon is adjusted by an electrically conductive element 307 which is turned on or off by remote sensory control of an adjacent thermocouple temperature reader 308 to maintain the surface temperature of the cheese ribbons entering the compression channel at or near 120 degree Fahreneith. This preferred embodiment is ideal for producing continuous cheese ribbons easily cut to industry standard sized cheese blocks. However, nearly any desirable cross-sectional shape and sized may be achieved through the combination of processes of the described invention.

Having fully described at least one embodiment of the present invention, other equivalent or alternative methods according to the present invention will be apparent to those skilled in the art. The invention has been described by way of summary, detailed description and illustration. The specific embodiments disclosed in the above drawings are not intended to be limiting. Implementations of the present invention with various different configurations are contemplated as within the scope of the present invention. The invention is thus to cover all modifications, equivalents, and alternatives falling within the spirit and scope of the following claims.

What is claimed is:

1. An apparatus comprising a plurality of enclosed moving channel units for forming continuous ribbons of cheese within the plurality of enclosed moving channel units, each said enclosed moving channel unit of said plurality of moving channel units comprising: two or more lengths of hollow channel enclosures, each length of hollow channel enclosure comprising an open first proximate end and an open second distal end, each said length of hollow channel enclosure having an internal side facing a hollow internal space formed therefrom and an external side facing the external environment, each said length of hollow channel enclosure providing a pulling mechanism, each said pulling mechanism comprising two separate belts, each said belt of said two separate belts being movable in linear fashion, each said belt of said two separate belts oppositely facing each other and in supporting contact with the internal side of their respective length of hollow channel enclosure, each said belt of said two separate belts being movable linearly from said first proximate end to said second distal end in supporting contact along the internal side of their respective hollow channel enclosure, each said two separate belts comprising food grade thermo-conductive material, each said two separate belts being configured to perform heat exchange between the internal side of the hollow channel enclosure and an independent external cooling element, said independent external cooling element comprising an enclosed container, said independent external cooling element containing a cooling medium within said enclosed container that pulls heat away from within said hollow channel enclosure by manner of heat transfer between said independent external cooling element and said two separate belts without direct contact of said cooling medium and said cheese ribbons, each said enclosed moving channel unit being positionable to another said enclosed moving channel unit between their each or left sides in parallel fashion, each said enclosed moving channel unit being positionable to another said enclosed moving channel unit between their each said proximate end and distal end, an electrode is positioned at the proximate end of one or more of said plurality of enclosed moving channel units such that said electrode is contactable with a surface of one or more cheese ribbons passing through said plurality of enclosed moving channel units, said electrode positionable adjacent to and in digital communication with a thermocouple temperature sensor, said thermocouple sensor is contactable with the surface of one or more cheese ribbon passing through said plurality of enclosed moving channel units, said electrode is automatically and remotely controllable between a conductive or non-conductive state and as to its level of electrical conduction by communication through said thermocouple temperature sensor.

2. Said method of laminating two or more ribbons of pasta filata cheese utilizing an apparatus according to claim 1 wherein two or more continuous ribbons of stretched, moulded, and cooled pasta filata cheese are passed through and from the distal ends of two or more enclosed moving channels positioned in a side by side manner, wherein said two or more continuous ribbons entering into the distal end of a single enclosed moving channel are in contact with the electrode and the thermocouple temperature sensor, said electrode being remotely and automatically controllable by said thermocouple sensor according to preconfigured temperature standards.

3. Said apparatus of claim 1 wherein the electrode comprises an electroconductive probe or an electroconductive plate.

4. Said method of laminating two or more ribbons of pasta filata cheese utilizing an apparatus according to claim 1 wherein two or more continuous ribbons of stretched, moulded, and cooled pasta filata cheese are passed through and from the distal ends of two or more enclosed moving channels positioned in a side by side manner, wherein said two or more continuous ribbons entering into the distal end of a single enclosed moving channel are in contact with the electrode and the thermocouple temperature sensor, said electrode being remotely and automatically controllable by said thermocouple sensor according to preconfigured temperature standards, wherein said two or more continuous ribbons of cheese are heated to a temperature above 110 degree Fahrenheit but below 160 degrees Fahrenheit.

* * * * *